US011966931B2

United States Patent
Hasegawa

(10) Patent No.: US 11,966,931 B2
(45) Date of Patent: Apr. 23, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventor: Keiji Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/981,025

(22) PCT Filed: Mar. 14, 2019

(86) PCT No.: PCT/JP2019/010700
§ 371 (c)(1),
(2) Date: Sep. 15, 2020

(87) PCT Pub. No.: WO2019/181756
PCT Pub. Date: Sep. 26, 2019

(65) Prior Publication Data
US 2021/0019769 A1    Jan. 21, 2021

(30) Foreign Application Priority Data
Mar. 19, 2018    (JP) .................................. 2018-050947

(51) Int. Cl.
*G06Q 20/20*        (2012.01)
*G06Q 30/02*        (2023.01)
(Continued)

(52) U.S. Cl.
CPC .............. *G06Q 30/02* (2013.01); *G06Q 20/20* (2013.01); *G07G 1/12* (2013.01); *G09F 23/02* (2013.01); *G09G 5/14* (2013.01)

(58) Field of Classification Search
CPC ........ G06Q 30/02; G06Q 20/20; A47F 9/046; H04B 1/48; G09F 27/00; G09F 3/20; G07G 1/12; G09G 5/14
See application file for complete search history.

(56) References Cited

U.S. PATENT DOCUMENTS 8,057,303 B2 *  11/2011  Rasmussen ......... G07F 17/3202
                                                      463/16
11,080,674 B1 *  8/2021  Chen .................... G06Q 20/341
(Continued)

FOREIGN PATENT DOCUMENTS

JP       11-86135 A      3/1999
JP       11-86142 A      3/1999
(Continued)

OTHER PUBLICATIONS

International Search Report for PCT Application No. PCT/JP2019/010700, dated Jun. 11, 2019.
(Continued)

*Primary Examiner* — Florian M Zeender
*Assistant Examiner* — Milena Racic

(57) ABSTRACT

Provided are an information processing apparatus, an information processing method, and a storage medium configured such that a mobile information device is detachable from a support stand having a display unit and the display unit of the support stand can be effectively used even when the mobile information device is detached from the support stand. The information processing apparatus includes: a mobile information device; a support stand that has a display unit and supports the mobile information device in a detachable manner; and a display control unit that switches information to be displayed on the display unit from first information to second information when the mobile information device is detached from the support stand.

8 Claims, 12 Drawing Sheets

(51) Int. Cl.
  *G07G 1/12* (2006.01)
  *G09F 23/02* (2006.01)
  *G09G 5/14* (2006.01)

(56) References Cited

U.S. PATENT DOCUMENTS

| | | | |
|---|---|---|---|
| 11,080,675 B1* | 8/2021 | Guise | G06Q 20/206 |
| 2008/0275894 A1* | 11/2008 | Charlton | G06F 16/48 |
| 2009/0198582 A1* | 8/2009 | Tokorotani | G06Q 20/208 |
| | | | 705/17 |
| 2015/0032557 A1 | 1/2015 | Suzuki | |
| 2015/0199668 A1* | 7/2015 | Fernando | G06Q 20/20 |
| | | | 705/14.65 |
| 2016/0283420 A1 | 9/2016 | Haga | |
| 2017/0078504 A1* | 3/2017 | Nagata | G09G 5/14 |
| 2017/0185363 A1* | 6/2017 | Ting | G06F 1/1626 |
| 2021/0248099 A1* | 8/2021 | Hasegawa | G06F 1/1654 |

FOREIGN PATENT DOCUMENTS

| | | |
|---|---|---|
| JP | 2002-183834 A | 6/2002 |
| JP | 2005-242727 A | 9/2005 |
| JP | 2012-137979 A | 7/2012 |
| JP | 2014-041559 A | 3/2014 |
| JP | 2015-026169 A | 2/2015 |
| JP | 2016-186760 A | 10/2016 |
| JP | 2017-162515 A | 9/2017 |
| KR | 10-2017-0090201 A | 8/2017 |
| KR | 101822552 B1 * | 1/2018 |

OTHER PUBLICATIONS

Japanese Office Action dated May 30, 2023 in Japanese Application No. 2022-145750.

\* cited by examiner

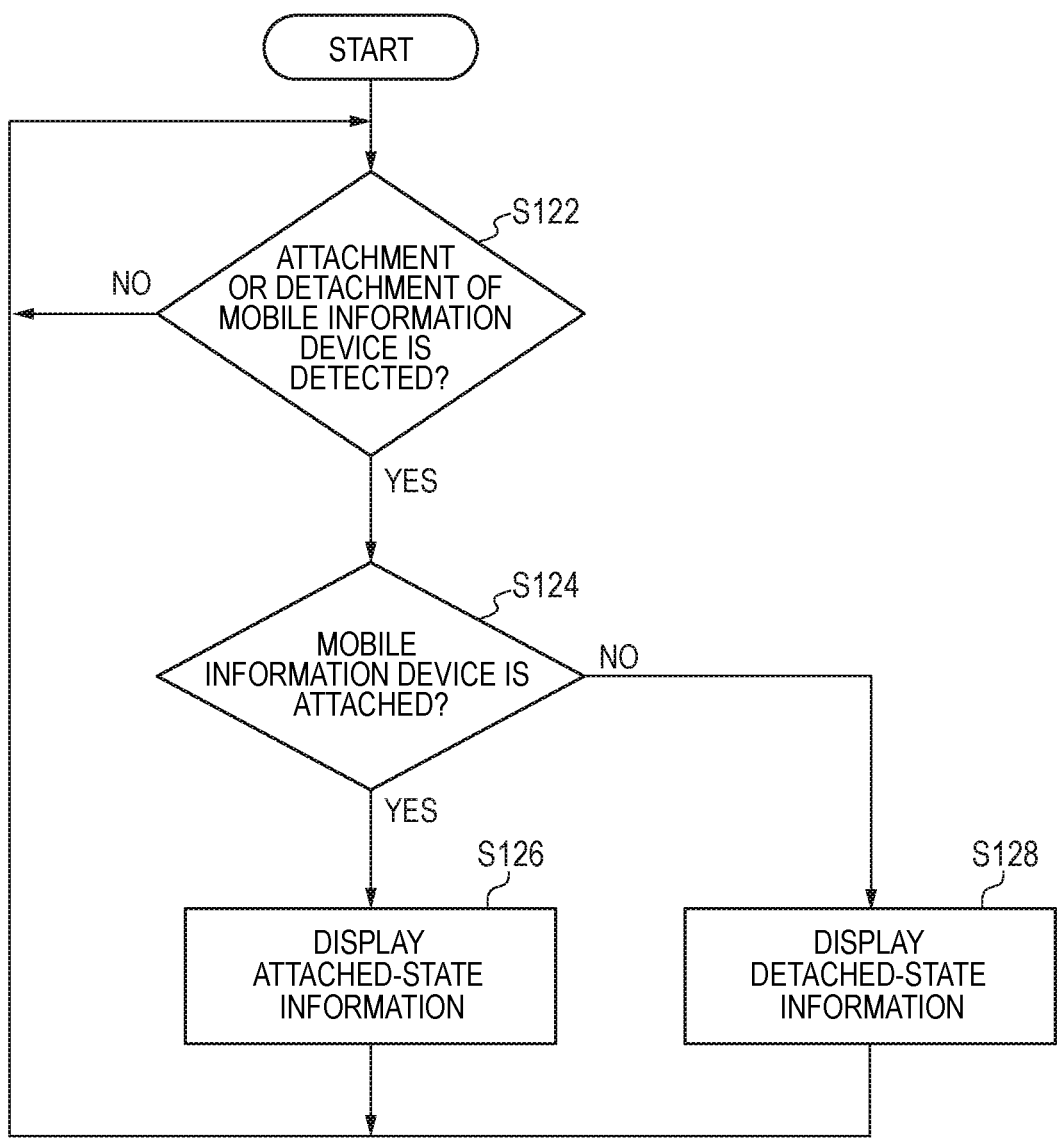

INFORMATION PROCESSING APPARATUS, INFORMATION PROCESSING METHOD, AND STORAGE MEDIUM

This application is a National Stage Entry of PCT/JP2019/010700 filed on Mar. 14, 2019, which claims priority from Japanese Patent Application 2018-050947 filed on Mar. 19, 2018, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a POS register formed of an apparatus base having a customer side display device and a salesclerk side display device detachable from the apparatus base. Patent Literature discloses that the salesclerk side display device functions as a tablet terminal when detached from the apparatus base.

CITATION LIST

Patent Literature

PTL 1: Japanese Patent Application Laid-open No. 2014-41559

SUMMARY OF INVENTION

Technical Problem

In the apparatus disclosed in Patent Literature 1, however, it is not clear how to control the display on the customer side display device in a state where the salesclerk side display device is detached from the apparatus base. Thus, in the apparatus disclosed in Patent Literature 1, it is not possible to effectively use the customer side display device in a state where the salesclerk side display device is detached from the apparatus base.

In view of the problem described above, the present invention intends to provide an information processing apparatus, an information processing method, and a storage medium configured such that a mobile information device is detachable from a support stand having a display unit and the display unit of the support stand can be effectively used even when the mobile information device is detached from the support stand.

Solution to Problem

According to one example aspect of the present invention, provided is an information processing apparatus including: a mobile information device; a support stand that has a display unit and supports the mobile information device in a detachable manner; and a display control unit that switches information to be displayed on the display unit from first information to second information when the mobile information device is detached from the support stand.

According to another example aspect of the present invention, provided is an information processing method including: determining whether or not a mobile information device is detached from a support stand that has a display unit and supports the mobile information device in a detachable manner; and switching information to be displayed on the display unit from first information to second information when the mobile information device is detached from the support stand.

According to yet another example aspect of the present invention, provided is a storage medium storing a program that causes a computer to perform: determining whether or not a mobile information device is detached from a support stand that has a display unit and supports the mobile information device in a detachable manner; and switching information to be displayed on the display unit from first information to second information when the mobile information device is detached from the support stand, and the computer is the mobile information device or the support stand.

Advantageous Effects of Invention

According to the present invention, in a configuration such that a mobile information device is detachable from a support stand having a display unit, it is possible to effectively use the display unit of the support stand even when the mobile information device is detached from the support stand.

BRIEF DESCRIPTION OF DRAWINGS

FIG. 7 is a flowchart illustrating an operation of switching display (2) on the information processing apparatus according to the first example embodiment of the present invention.

DESCRIPTION OF EMBODIMENTS

First Example Embodiment

An information processing apparatus and an information processing method according to a first example embodiment of the present invention will be described with reference to FIG. 1 to FIG. 8C.

Figure 1:
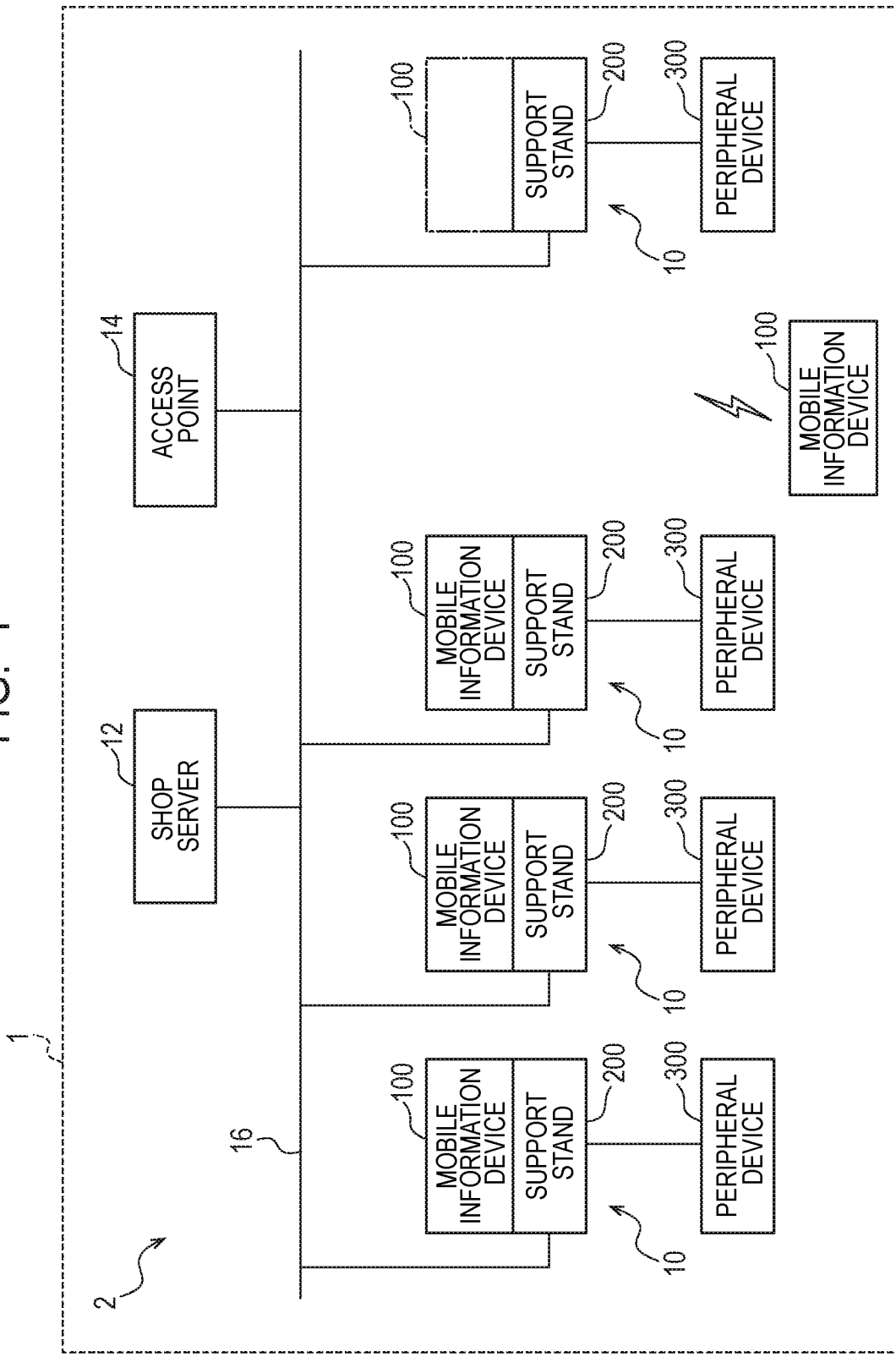
FIG. 1 is a schematic diagram illustrating a POS system using an information processing apparatus according to a first example embodiment of the present invention.
Figure 2:
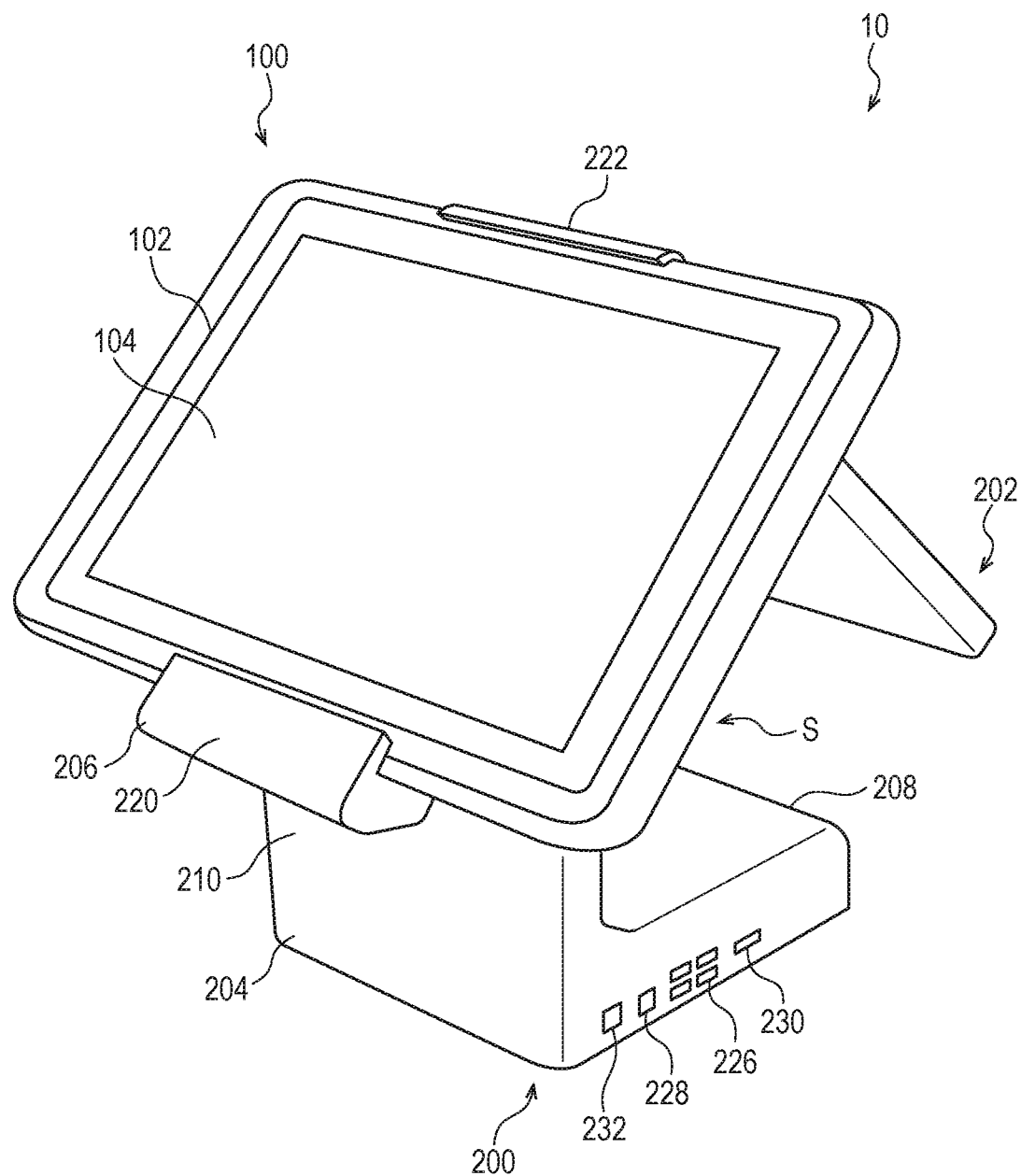
FIG. 2 is a schematic diagram (1) illustrating a configuration of the information processing apparatus according to the first example embodiment of the present invention.
Figure 3:
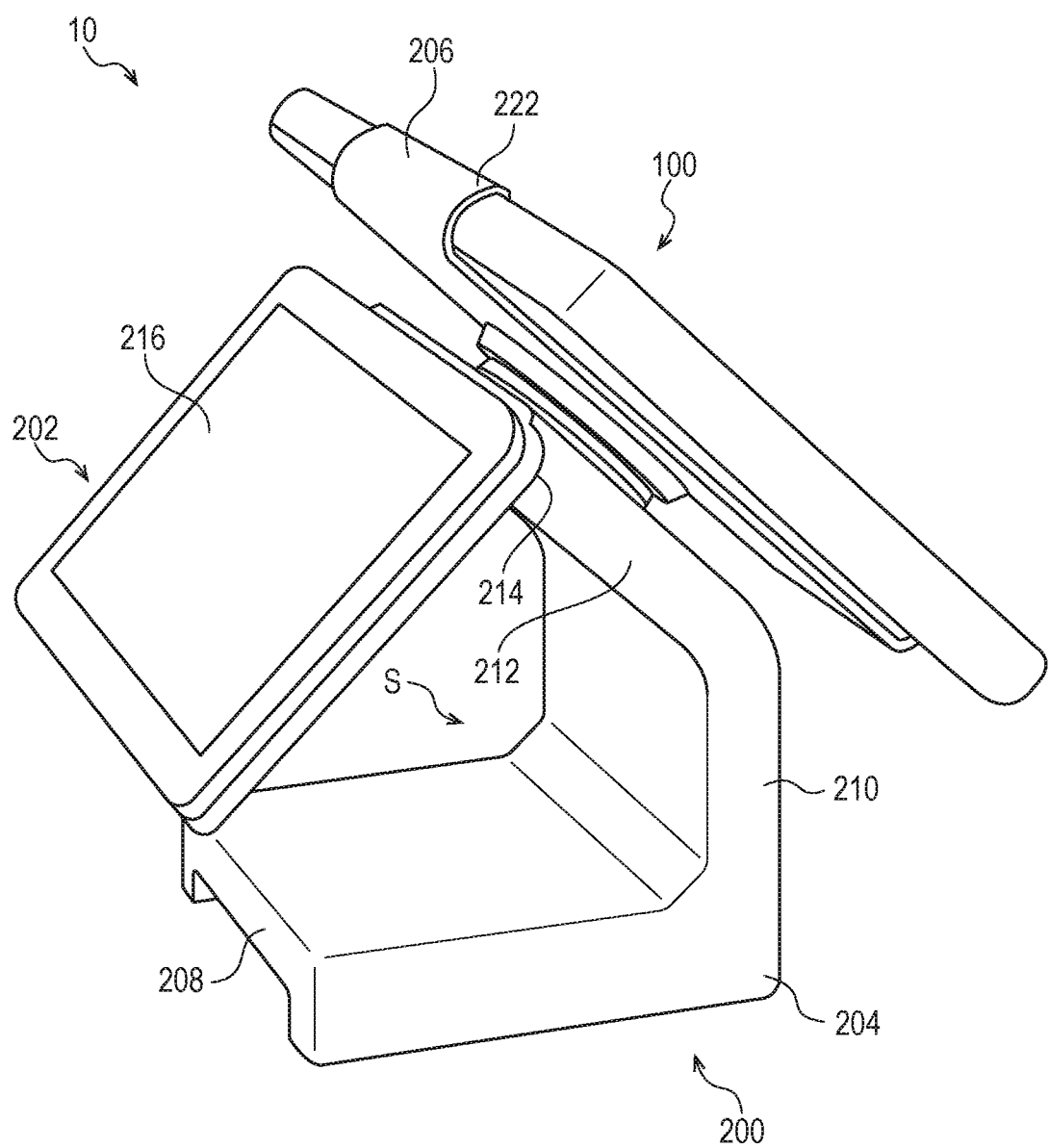
FIG. 3 is a schematic diagram (2) illustrating a configuration of the information processing apparatus according to the first example embodiment of the present invention.
Figure 4:
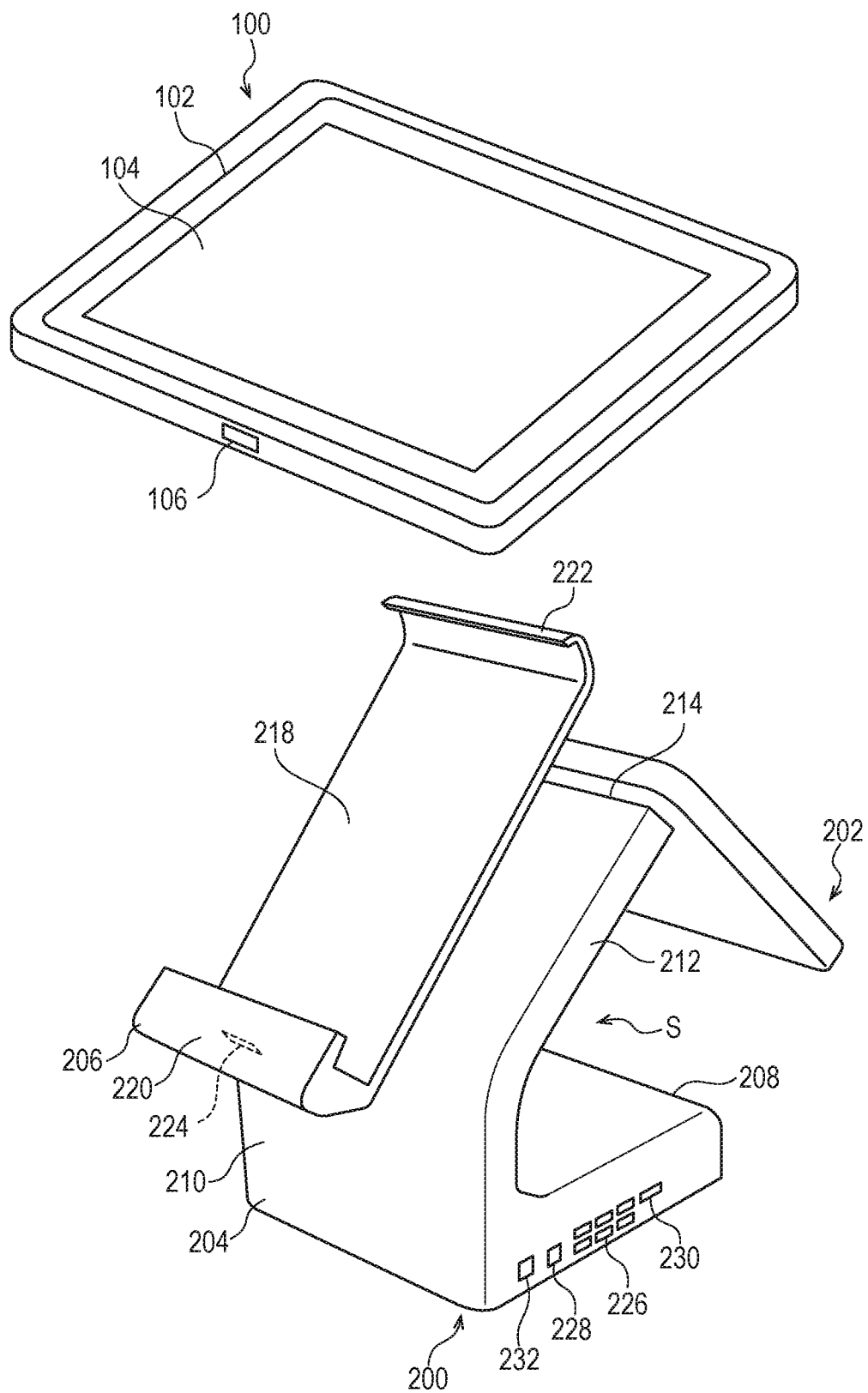
FIG. 4 is a schematic diagram (3) illustrating a configuration of the information processing apparatus according to the first example embodiment of the present invention.
Figure 5:
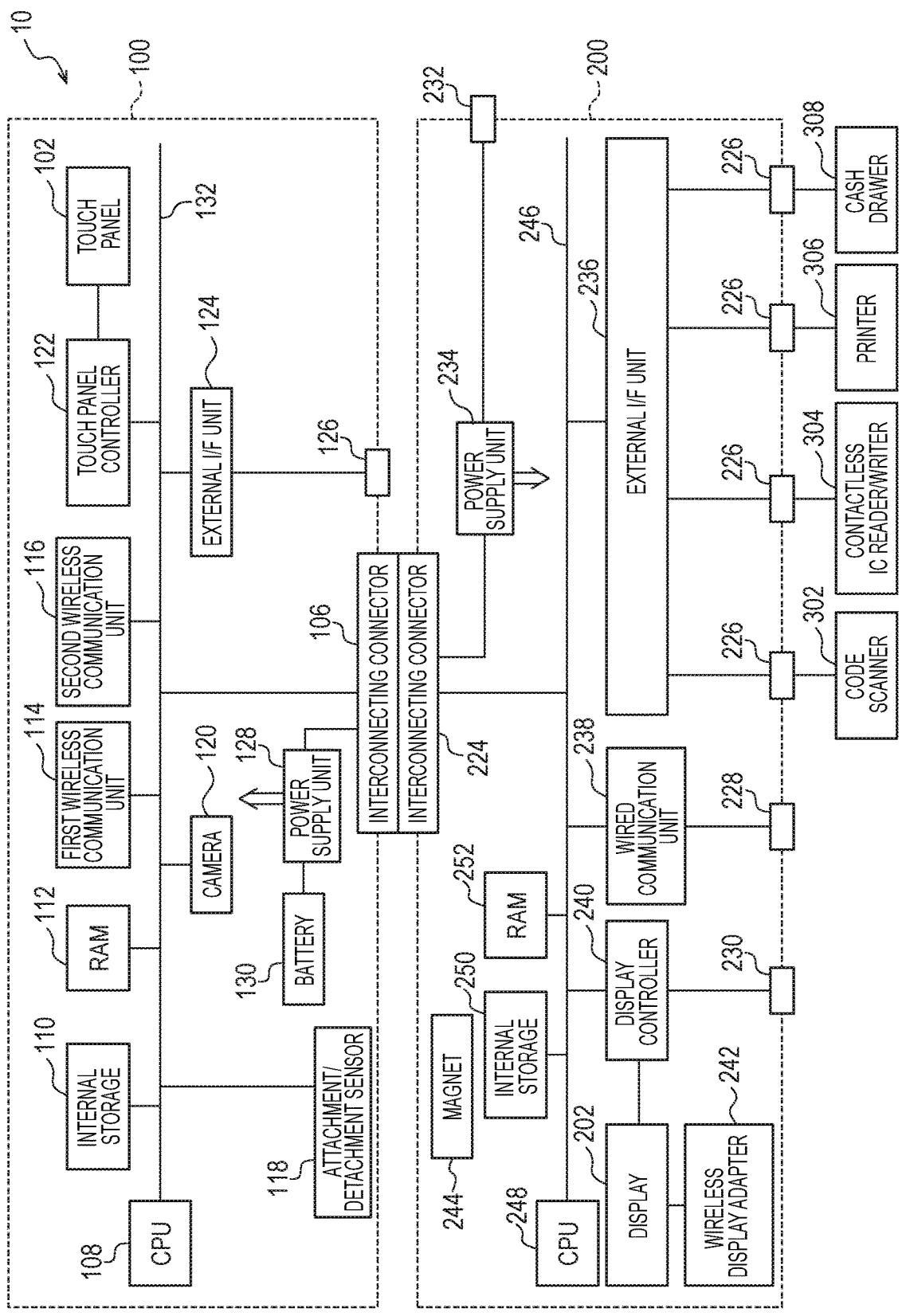
FIG. 5 is a block diagram illustrating a configuration of the information processing apparatus according to the first example embodiment of the present invention.

First, a configuration of the information processing apparatus according to the present example embodiment will be described with reference to FIG. 1 to FIG. 5. FIG. 1 is a schematic diagram illustrating a POS system using the information processing apparatus according to the present example embodiment. FIG. 2 to FIG. 4 are schematic diagrams illustrating the configuration of the information processing apparatus according to the present example embodiment. FIG. 5 is a block diagram illustrating a configuration of the information processing apparatus according to the present example embodiment.

The information processing apparatus according to the present example embodiment is used as a POS apparatus in a POS system introduced in a shop that sells products. As illustrated in FIG. 1, a POS system 2 is constructed and introduced in a shop 1. The POS system 2 includes information processing apparatuses 10 according to the present example embodiment, a shop server 12, and an access point 14. The information processing apparatuses 10, the shop server 12, and the access point 14 are connected to a network 16 that is a Local Area Network (LAN), for example.

Each information processing apparatus 10 that functions as a POS apparatus has a mobile information device 100 and a support stand 200 for the mobile information device 100 that supports the mobile information device 100 in a detachable manner. A peripheral device 300 is connected to the support stand 200. One or a plurality of information processing apparatuses 10 according to the present example embodiment are installed in the shop 1. The support stand 200 of the information processing apparatus 10 is installed on a register counter of the shop 1, for example. Note that the number of information processing apparatuses 10 is not particularly limited, and one or a plurality of information processing apparatuses 10 may be installed in accordance with the size of the shop 1 or the like. Further, the installation place of the support stand 200 of the information processing apparatus 10 is not particularly limited as well, and the support stand 200 may be installed on other places than a register counter of the shop 1.

The mobile information device 100 is an information device that can be carried by a salesclerk who is an operator. The mobile information device 100 functions as a POS terminal in the POS system 2 introduced in the shop 1. The mobile information device 100 can be used by a salesclerk in any state of an attached state and a detached state. That is, the mobile information device 100 can be used by a salesclerk in the attached state that is a state of being attached to the support stand 200 installed on the register counter of the shop 1. Further, the mobile information device 100 can be carried and used by a salesclerk not only at the register counter of the shop 1 but also at a place of the shop 1 other than the register counter in the detached state that is a state of being detached from the support stand 200.

The mobile information device 100 in the attached state of being attached to the support stand 200 is connected to the network 16 in a wired manner via a wired communication unit 238 of the support stand 200 (see FIG. 5). Thereby, the mobile information device 100 in the attached state can transmit and receive data to and from the shop server 12 and other external devices via the network 16 by wired communication. Note that the connection between the mobile information device 100 in the attached state and the network 16 is not limited to the above. For example, in response to detection of being attached to the support stand 200, the mobile information device 100 can be connected to the network 16 by a wired connection or a wireless connection via the wired communication unit 238 or a wireless communication unit of the support stand 200.

The peripheral device 300 attached to the support stand 200 may include, for example, a code scanner 302, a contactless integrated circuit (IC) reader/writer 304, a printer 306, a cash drawer 308, and the like described later. The mobile information device 100 in the attached state can control the peripheral device 300 via the support stand 200.

In such a way, the support stand 200 can function as a cradle or a docking station that is an extended unit that extends the function of the mobile information device 100 attached thereto.

On the other hand, the mobile information device 100 in the detached state detached from the support stand 200 is wirelessly connected to the network 16 by wireless communication with the access point 14. Thereby, the mobile information device 100 in the detached state is able to transmit and receive data to and from the shop server 12 and other external devices via the network 16 by wireless communication. Note that the connection between the mobile information device 100 in the detached state and the network 16 is not limited to the above. For example, the mobile information device 100 in the detached state is also able to be connected by a wireless connection or a wired connection to the support stand 200 and connected to the network 16 by a wired connection or a wireless connection via the wired communication unit 238 or the wireless communication unit of the support stand 200.

The shop server 12 is a POS server that performs management of information on products sold in the shop 1, aggregation of sales data, management of proceeds, management of inventory, or the like and manages the operation of the POS system 2, for example. The shop server 12 is installed in a backyard of the shop 1, for example. The shop server 12 manages data of product information or the like used in the information processing apparatus 10 used as a POS apparatus.

The access point 14 is a wireless communication device that wirelessly communicates with the mobile information device 100 in the detached state and connects the mobile information device 100 to the network 16. The access point 14 is installed on a ceiling or the like of the shop 1, for example. Further, one or a plurality of access points 14 may be installed in accordance with the scale of the shop 1, a radio environment, or the like, for example.

The information processing apparatus 10 according to the present example embodiment has the mobile information device 100 and the support stand 200 that support the mobile information device 100 in a detachable manner, as illustrated in FIG. 2 to FIG. 4. The support stand 200 has a display 202. Herein, FIG. is a perspective view illustrating the information processing apparatus 10 with the mobile information device 100 being in the attached state when viewed from the back side of the display 202. FIG. 3 is a perspective view illustrating the information processing apparatus 10 with the mobile information device 100 being in the attached state when viewed from the front side of the display 202. FIG. 4 is a perspective view illustrating a state where the mobile information device 100 is detached from the information processing apparatus 10 illustrated in FIG. 2.

The support stand 200 that supports the mobile information device 100 has the display 202, a base part 204, and a holder part 206.

The base part 204 functions as a support member that supports the mobile information device 100 and the display 202. Furthermore, the base part 204 functions as a casing that accommodates a power supply unit 234, an external interface (I/F) unit 236, or the like described later.

The base part 204 has a bottom portion 208 placed on an installation place such as the register counter or the like and a plate-like leg portion 210 extending upward from one end of the bottom portion 208. The upper part of the leg portion 210 forms a slope portion 212 inclined toward the other end side of the bottom portion 208 with respect to the perpendicular direction.

An attachment portion 214 for the display 202 is provided in the upper end of the slope portion 212 inclined with respect to the perpendicular direction. The display 202 is attached to the attachment portion 214 so as to face diagonally upward. That is, the display 202 is attached to the attachment portion 214 such that a display screen 216 faces diagonally upward outside the other end of the base part 204 opposite to the one end to which the leg portion 210 of the base part 204 is provided. The display 202 is fixed to the attachment portion 214. The attachment portion 214 functions as a support part that supports the display 202. The method of attaching the display 202 to the attachment portion 214 is not particularly limited, and screwing or the like is used, for example. Further, the attachment portion 214 may be configured so that the inclined angle of the display 202 can be adjusted by using an angle adjustment mechanism such as a hinge, for example.

The display 202 attached to the attachment portion 214 functions as a display unit, has a rectangular plate-like external shape, and has the rectangular display screen 216 corresponding to the external shape of the display 202. The rectangular plate-like display 202 is attached to the attachment portion 214 with the longer axis direction thereof being horizontally arranged. Note that the display 202 may be attached to the attachment portion 214 with the shorter axis direction thereof being horizontally arranged.

The display 202 that functions as a display unit having the display screen 216 is not particularly limited and may be formed of various displays. For example, the display 202 is formed of a liquid crystal display, an organic light emitting diode (OLED) display, a light emitting diode (LED) display, a vacuum fluorescent display (VFD), a fluorescent indicator panel (FIP), or the like.

The support stand 200 is installed in a register counter such that the display screen 216 of the display 202 faces the customer side who comes to the register counter for checkout of a purchasing product, for example. The attachment portion 214 supports the display 202 such that the display faces the customer side. That is, the attachment portion 214 supports the display 202 such that the display screen 216 of the display 202 faces the customer side. Since the display 202 is attached to the attachment portion 214 such that the display screen 216 faces diagonally upward as described above, a customer may easily view the display screen 216.

The display 202 displays various information such as checkout information on the display screen 216 to a customer in response to the control of the mobile information device 100. The checkout information displayed on the display 202 may be, for example, a name of a product processed for payment, a quantity of the product, a selling price, a discount price, a total amount, a tax amount, a receipt amount, a change amount, or the like. Further, the display 202 can also display advertisement, solicitation, information related to an event, or the like on the display screen 216 to a customer in response to the control of the mobile information device 100. Further, the display 202 may also be configured as a touch panel. In such a case, the display 202 can accept touch entry performed by a customer on the display screen 216.

As described later, on the display 202, displayed information is switched when the mobile information device 100 is detached from the support stand 200. In a state where the mobile information device 100 is attached to the support stand 200, attached-state information such as checkout information as described above is displayed on the display 202. In a state where the mobile information device 100 is detached from the support stand 200, detached-state information such as advertisement information, guidance information, or the like different from the attached-state information is displayed. Note that the attached-state information and the detached-state information displayed on the display 202 may be image information or may be video information. Further, the attached-state information and the detached-state information may be not required to be completely different, and a part of information may be duplicated with each other.

The base part 204 including the slope portion 212 has a shape in which a space S is formed between the display 202 supported by the attachment portion 214 and the slope portion 212. In the space S, peripheral devices connected to the support stand 200 can be installed, and this enables space saving of a register counter or the like that is the installation place of the information processing apparatus 10. Further, with the space S being formed, a heat radiation effect can be obtained in the information processing apparatus 10.

Further, the holder part 206 is provided on the upper slope face of the slope portion 212. The holder part 206 functions as a support part that grips the mobile information device 100 in a direction along the slope face of the slope portion 212 and thereby holds and supports the mobile information device 100. The holder part 206 supports the mobile information device 100 in a detachable manner adjacent to the display 202 on the back side of the display 202 that is the opposite side of the display screen 216. Note that the holder part 206 may be a part that supports the mobile information device 100 in a detachable manner adjacent to the display 202 on the side-face side of the display 202.

The mobile information device 100 held by the holder part 206 has a rectangular plate-like external shape and has a display screen 104 of a rectangular touch panel 102 corresponding to the external shape of the mobile information device 100. The holder part 206 grips and holds the mobile information device 100 from the shorter axis direction of the mobile information device 100 such that the longer axis direction of the rectangular plate-like mobile information device 100 is horizontally arranged. Further, the holder part 206 supports the mobile information device 100 such that the mobile information device 100 faces diagonally upward. That is, the holder part 206 holds the mobile information device 100 such that the display screen 104 of the touch panel 102 of the mobile information device 100 faces diagonally upward outside one end at which the leg portion 210 of the base part 204 is provided. Note that the holder part 206 may be a part that holds the mobile information device 100 such that the shorter axis direction of the rectangular plate-like mobile information device 100 is horizontally arranged.

Further, the holder part 206 supports the mobile information device 100 such that the mobile information device 100 faces the salesclerk side that is different from the customer side. That is, the holder part 206 supports the mobile information device 100 such that the display screen 104 of the touch panel 102 faces the salesclerk side. Since the mobile information device 100 is supported by the holder part 206 such that the display screen 104 faces diagonally upward as described above, a salesclerk may easily view the display screen 104.

The holder part 206 supports the mobile information device 100 such that the horizontal axis direction of the mobile information device 100 is parallel to the horizontal axis direction of the display 202. That is, the holder part 206 supports the mobile information device 100 such that the horizontal direction of the display screen 104 of the mobile information device 100 is parallel to the horizontal axis direction of the display screen 216 of the display 202. Note that the horizontal axis direction of the mobile information device 100 means the longer axis direction when the mobile information device 100 is held by the holder part 206 with the shorter axis direction thereof being horizontally arranged and means the shorter axis direction when the mobile information device 100 is held by the holder part 206 with the shorter axis direction thereof being horizontally arranged. Further, the horizontal axis direction of the display 202 means the longer axis direction when the display 202 is attached to the attachment portion 214 with the longer axis direction thereof being horizontally arranged and means the shorter axis direction when the display 202 is attached to the attachment portion 214 with the shorter axis direction thereof being horizontally arranged. With the mobile information device 100 being supported in parallel to the display 202 in such a way, a salesclerk and a customer facing the salesclerk may make face-to-face communication while easily viewing the display screen 104 of the touch panel 102 and the display screen 216 of the display 202, respectively.

The holder part 206 has a back-support portion 218 and hook portions 220 and 222 provided to the lower end and the upper end of the back-support portion 218, respectively. The holder part 206 grips the mobile information device 100 by the lower hook portion 220 and the upper hook portion 222 and thereby holds and supports the mobile information device 100.

When the mobile information device 100 is attached to the holder part 206, the mobile information device 100 with the longer axis direction thereof being horizontally arranged is pushed against the back-support portion 218 of the holder part 206 by a salesclerk who is an operator. The hook portions 220 and 222 are pushed away by the pushed mobile information device 100 and elastically expand outward. In response to the mobile information device 100 being further pushed and coming into contact with the back-support portion 218, the hook portions 220 and 222 elastically recover and then latch and engage to the ends of the mobile information device 100. In such a way, the mobile information device 100 is attached to the holder part 206.

On the other hand, when the mobile information device 100 is detached from the holder part 206, the mobile information device 100 attached to the holder part 206 is pulled away from the holder part 206 by a salesclerk that is an operator. The hook portions 220 and 222 are pushed away by the mobile information device 100 being pulled away and elastically expand outward. In response to the mobile information device 100 being further pulled away, the hook portions 220 and 222 are detached from the ends of the mobile information device 100 and elastically recover. In such a way, the mobile information device 100 is detached from the holder part 206.

Note that a mechanism by which the holder part 206 holds the mobile information device 100 in a detachable manner is not limited to the mechanism using the hook portions 220 and 222, and various mechanisms may be used. Further, the holder part 206 may be a part that supports the mobile information device 100 placed on the back-support portion 218 from the bottom side, for example.

The holder part 206 supports the mobile information device 100 in a detachable manner adjacent to the display 202 on the back side or on the side-face side of the display 202 attached and supported by the attachment portion 214 as described above. The mobile information device 100 supported by the holder part 206 faces a different direction from the display 202 supported by the attachment portion 214. That is, the display screen 104 of the touch panel 102 of the mobile information device 100 supported by the holder part 206 faces a different direction from the display screen 216 of the display 202 supported by the attachment portion 214. More specifically, the display screen 104 of the touch panel 102 of the mobile information device 100 and the display screen 216 of the display 202 face diagonally upward in the opposite directions to each other.

The back of the mobile information device 100 supported by the holder part 206 as described above faces the back side of the display 202 supported by the attachment portion 214. More specifically, the back of the display 202 and the back of the mobile information device 100 are substantially opposed to each other.

An interconnecting connector 224 is provided to the holder part 206 that holds the mobile information device 100. The interconnecting connector 224 is a connector used for electrically connecting the mobile information device 100 supported by the holder part 206 to the support stand 200. For example, the interconnecting connector 224 is provided to the lower hook portion 220 of the holder part 206. When an interconnecting connector 106 provided to the mobile information device 100 is connected to the interconnecting connector 224, the mobile information device 100 is electrically connected to the support stand 200.

Note that the connection form of the interconnecting connectors 106 and 224 is not particularly limited, and various schemes can be employed. For example, it is possible to employ the following connection scheme, that is, the interconnecting connectors 106 and 224 are formed of contact terminals in which contact points corresponding to each other are arranged, when the contact points corresponding to each other are positioned by attractive force of magnets, three-dimensional shapes, or the like and come into contact with each other, both of them are electrically connected to each other. Further, for example, it is also possible to employ the following connection scheme, that is, the interconnecting connector 224 on the support stand 200 side is of a male type, the interconnecting connector 106 on the mobile information device 100 side is of a female type, the interconnecting connector 224 is fit into the interconnecting connector 106, and thereby both of them are electrically connected.

The interconnecting connector 224 functions as a connection portion that connects the mobile information device 100 attached to the holder part 206 to the display 202. The mobile information device 100 can control the display of the display 202 connected via the interconnecting connectors 106 and 224.

Further, a plurality of Universal Serial Bus (USB) connectors 226 used for connecting peripheral devices are provided in the lower side part of the base part 204, for example. As the peripheral device 300, for example, the code scanner 302, the contactless IC reader/writer 304, the printer 306, the cash drawer 308, or the like may be connected to the USB connectors 226.

Further, a communication connector 228 used for connecting a communication cable such as LAN cable is provided in the lower side part of the base part 204, for example. The communication connector 228 is a LAN connector such as RJ-45, for example. The support stand 200 is connected to the network 16 via a communication cable connected to the communication connector 228.

Further, a display terminal 230 used for connecting an external display is provided in the lower side part of the base part 204, for example. The display terminal 230 is, for example, a High-Definition Multimedia Interface (HDMI) (registered trademark) terminal, a Digital Visual Interface (DVI) terminal, a Video Graphics Array (VGA) terminal, or the like.

Further, a power supply connector 232 used for supplying power is provided in the lower side part of the base part 204, for example. An alternating current (AC) adapter is connected to the power supply connector 232. The AC adapter converts AC power from commercial power supply into DC power and supplies the DC power to the support stand 200.

Note that the portions of the base part 204 in which the USB connector 226, the communication connector 228, the display terminal 230, and the power supply connector 232 are provided are not particularly limited. These connectors and terminal may be provided in suitable portions of the base part 204.

On the other hand, the mobile information device 100 that functions as a POS terminal is a portable computer device such as a tablet terminal. The mobile information device 100 is attached to and supported by the holder part 206 of the support stand 200 in a detachable manner. The mobile information device 100 has a rectangular plate-like shape and is supported by of the support stand 200 with the longer axis direction thereof being horizontally arranged. The mobile information device 100 can be used both in the attached state of being attached to the support stand 200 and in the detached state of being detached from the support stand 200.

A POS application program having a product proceed registration function, a checkout function, a product information registration function, an inventory management function, or the like is installed in the mobile information device 100, and the mobile information device 100 functions as a part of the POS apparatus. The mobile information device 100 can be used for different purposes or the same purpose between the attached state and the detached state. The mobile information device 100 can be configured such that the function thereof is switched when detached from the support stand 200. Further, an application program other than the POS application program may be installed in the mobile information device 100 if necessary.

First, the mobile information device 100 in the attached state can function as a part of the POS apparatus that performs a checkout process of a product purchased by a customer, for example. In such a case, the mobile information device 100 in the attached state is used by a salesclerk in the register counter and controls the peripheral device connected to the support stand 200 to perform the checkout process. The peripheral device may include the code scanner 302, the contactless IC reader/writer 304, the printer 306, the cash drawer 308, or the like.

On the other hand, the mobile information device 100 in the detached state can function as a handy terminal that performs an inventory management process, for example. In such a case, the mobile information device 100 in the detached state is carried by a salesclerk from the register counter and used in a storage place of products, such as a warehouse in the shop 1, and performs the inventory management process. The inventory management process includes inspection, registration of a product, stocktaking, ordering, or the like. Note that, when the mobile information device 100 in the detached state is used as a POS apparatus, the peripheral device described above may be directly connected to the mobile information device 100 in the detached state in a wired or wireless manner if necessary.

The touch panel 102 of the mobile information device 100 functions as a display unit and an input unit, displays a window of an application program started up in the mobile information device 100 on the display screen 104 to display various information to the salesclerk. The salesclerk may operate the application program by touch entry on the display screen 104 of the touch panel 102.

The interconnecting connector 106 described above is provided in the side end in the longer axis direction of the mobile information device 100. When the interconnecting connector 106 is connected to the interconnecting connector 224 of the support stand 200 as described above, the mobile information device 100 is electrically connected to the support stand 200.

FIG. 5 illustrates an example of a hardware configuration of the information processing apparatus 10 in which the mobile information device 100 is attached to the support stand 200. Note that the hardware configuration of the information processing apparatus 10 is not limited to the configuration illustrated in FIG. 5, and various configurations may be employed.

As illustrated in FIG. 5, the mobile information device 100 has a central processing unit (CPU) 108, an internal storage 110, and a random access memory (RAM) 112. Further, the mobile information device 100 has a first wireless communication unit 114, a second wireless communication unit 116, an attachment/detachment sensor 118, and a camera 120. Further, the mobile information device 100 has a touch panel controller 122 and the touch panel 102. Further, the mobile information device 100 has the interconnecting connector 106, an external I/F unit 124, and a USB connector 126. Furthermore, the mobile information device 100 has a power supply unit 128 and a battery 130.

The CPU 108, the internal storage 110, the RAM 112, the first wireless communication unit 114, the second wireless communication unit 116, the attachment/detachment sensor 118, the camera 120, the interconnecting connector 106, the touch panel controller 122, and the external I/F unit 124 are connected to a bus line 132. The USB connector 126 is connected to the external I/F unit 124. The power supply unit 128 is connected to the interconnecting connector 106. The battery 130 is connected to the power supply unit 128.

The CPU 108 operates by executing a program stored in the internal storage 110 and functions as a control unit that controls the overall operation of the mobile information device 100. Further, the CPU 108 executes a POS application program stored in the internal storage 110 to perform various processes as the POS apparatus. The RAM 112 provides a memory area required for the operation of the CPU 108.

The internal storage 110 is formed of a storage medium such as a nonvolatile memory, a hard disk drive, or the like and functions as a storage unit. The internal storage 110 stores a program executed by the CPU 108, data referenced by the CPU 108 in execution of the program, or the like.

The first wireless communication unit 114 wirelessly communicates with the access point 14 or the like in accordance with the specification of wireless LAN, for example, under the control of the CPU 108. The specification of wireless LAN may be Wi-Fi (registered trademark) or the like conforming to IEEE802.11 defined by the Institute of Electrical and Electronics Engineers, Inc. (IEEE). Further, the first wireless communication unit 114 can also function as a wireless communication unit that wirelessly outputs display output of the mobile information device 100 to a wireless display adapter 242 of the support stand 200 as described in the second example embodiment.

The second wireless communication unit 116 wirelessly communicates with a peripheral device having a corresponding wireless communication function in accordance with a Bluetooth (registered trademark) communication scheme, an infrared communication scheme, or the like under the control of the CPU 108. Thereby, the CPU 108 can control the peripheral device via the second wireless communication unit 116.

The attachment/detachment sensor 118 detects attachment/detachment of the mobile information device 100 and outputs an output signal in accordance with whether or not the mobile information device 100 is attached to the support stand 200. The attachment/detachment sensor 118 is a magnetic sensor, for example, and detects a magnetic field caused by a magnet 244 provided to the support stand 200 to detect attachment/detachment of the mobile information device 100. Note that the attachment/detachment sensor 118 may be a sensor that detects attachment/detachment of the mobile information device 100 by an optical method, an electrical method, a mechanical method, or other methods.

The camera 120 captures an image of a subject and outputs image data of the subject under the control of the CPU 108. For example, the mobile information device 100 in the detached state can also function as an image scanner that captures an image of a code symbol provided on a product or the like by the camera 120 and acquires information from the captured image. A code symbol is not particularly limited and may be, for example, a one-dimensional code such as a barcode, a two-dimensional code such as a QR code (registered trademark), or the like.

The touch panel 102 functions as a display unit having the display screen 104 and functions as an input unit and functions as an input unit that accepts touch entry performed on the display screen 104. The touch panel controller 122 controls the display on the display screen 104 of the touch panel 102 and monitors touch entry performed on the display screen 104 to acquire input data caused by touch entry under the control of the CPU 108.

The interconnecting connector 106 is connected to the interconnecting connector 224 of the support stand 200 in a detachable manner when the mobile information device 100 is attached to the support stand 200, as described above. The CPU 108 can control each component of the support stand 200 when the interconnecting connector 106 is connected to the interconnecting connector 224.

The external I/F unit 124 controls transmission and reception of data via the USB connector 126 under the control of the CPU 108. A peripheral device connectable in the USB specification can be connected to the USB connector 126 in a detachable manner if necessary. The CPU 108 can control the peripheral device connected to the USB connector 126.

The power supply unit 128 supplies power supplied from the battery 130 as driving power to each component of the mobile information device 100. The mobile information device 100 in the detached state can be operated by the driving power from the battery 130.

Further, when the mobile information device 100 is in the attached state, charging power and driving power are supplied to the power supply unit 128 from a power supply unit 234 of the support stand 200 via the interconnecting connectors 106 and 224. The power supply unit 128 charges the battery 130 with the charging power supplied from the power supply unit 234. Further, the power supply unit 128 supplies the driving power supplied from the power supply unit 234 to each component of the mobile information device 100. The mobile information device 100 in the attached state can be operated by the driving power supplied from the power supply unit 234.

The support stand 200 has the display 202, the interconnecting connector 224, the USB connectors 226, the communication connector 228, the display terminal 230, and the power supply connector 232, as described above. Further, the support stand 200 has the power supply unit 234, an external I/F unit 236, a wired communication unit 238, a display controller 240, a wireless display adapter 242, and a magnet 244.

The interconnecting connector 224, the external I/F unit 236, the wired communication unit 238, and the display controller 240 are connected to a bus line 246. The interconnecting connector 224 is connected to the power supply unit 234. The power supply connector 232 is connected to the power supply unit 234. The USB connectors 226 are connected to the external I/F unit 236. The communication connector 228 is connected to the wired communication unit 238. The display 202 and the display terminal 230 are connected to the display controller 240. The wireless display adapter 242 is connected to the display 202.

The external I/F unit 236 controls transmission and reception of data via the USB connector 226 under the control of the CPU 108. As the peripheral devices connectable in the USB specification, the code scanner 302, the contactless IC reader/writer 304, the printer 306, and the cash drawer 308 are connected to the plurality of USB connectors 226 in a detachable manner. The CPU 108 of the mobile information device 100 can control the peripheral devices connected to the USB connectors 226.

The wired communication unit 238 is connected to the network 16 via a communication cable connected to the communication connector 228 and transmits and receives data via the network 16. The CPU 108 of the mobile information device 100 can transmit and receive data to and from the shop server 12 or the like on the network 16 via the wired communication unit 238.

The display 202 functions as a display unit having the display screen 216. The display 202 is controlled by the mobile information device 100. That is, the display controller 240 controls display on the display screen 216 of the display 202 under the control of the CPU 108 of the mobile information device 100. Further, the display controller 240 controls display on an external display when the external display is connected to the display terminal 230. Note that, when the display 202 or the external display is formed of a touch panel, the touch panel controller can be used.

The wireless display adapter 242 receives the wirelessly transmitted display output of the mobile information device 100 and displays the display output on the display 202. That is, when the mobile information device 100 is in a detached state, the wireless display adapter 242 controls display to the display screen 216 of the display 202 in accordance with display information wirelessly transmitted from the mobile information device 100. The transmission specification used for forming radio display output of the mobile information device 100 and transmitting the wireless display output to the wireless display adapter 242 is not particularly limited, and various specifications may be used. For example, the transmission specification may be, Miracast (registered trademark), AirPlay (registered trademark), Wireless Gigabit (WiGig) (registered trademark), or the like.

The power supply unit 234 supplies power supplied from the AC adapter connected to the power supply connector 232 to each component of the support stand 200 as the driving power. Further, the power supply unit 234 supplies power supplied from the AC adapter as the driving power to the peripheral device that can be operated by bus power connected to the USB connector 226.

Further, when the mobile information device 100 is in the attached state, the power supply unit 234 supplies the charging power and the driving power to the power supply unit 128 of the mobile information device 100 via the interconnecting connectors 106 and 224.

The magnet 244 is attached to the holder part 206, for example. As described above, the magnetic field caused by the magnet 244 is detected by the attachment/detachment sensor 118 in order to detect attachment/detachment of the mobile information device 100.

The code scanner 302 is operated under the control of the CPU 108 and reads a code symbol provided on a product or the like on which a checkout process is to be performed. The code symbol is not particularly limited and may be, for example, a one-dimensional or two-dimensional code such as a barcode, a QR code, or the like as described above.

The contactless IC reader/writer 304 operates under the control of the CPU 108 and acquires credit card information or electronic money card information for payment from a contactless IC chip of a device such as a smartphone of a customer or a medium such as a card of a customer.

The printer 306 is operated under the control of the CPU 108 and prints and outputs a receipt or the like.

The cash drawer 308 is operated under the operation of the CPU 108 and opens a drawer that stores coins, bills, or the like in transaction of cash for cash payment.

Note that a peripheral device other than the code scanner 302 or the like described above may be connected to the support stand 200 and operated if necessary.

In addition, the support stand 200 further has a CPU 248, the internal storage 250, and a RAM 252. The CPU 248, the internal storage 250, and the RAM 252 are connected to the bus line 246. The support stand 200 can function as a computer apparatus alone.

The CPU 248 operates by executing a program stored in the internal storage 250 and functions as a control unit that controls the operation of the entire support stand 200. Thereby, the CPU 248 can control the operation of each component in the support stand 200, control various data communication with the mobile information device 100, control the operation of the peripheral device 300, or the like. The RAM 252 provides a memory area required for the operation of the CPU 248.

Further, the CPU 248 functions as a display control unit that switches information to be displayed on the display 202 when the mobile information device 100 is detached from the support stand 200, as described later.

The internal storage 250 is formed of a storage medium such as a nonvolatile memory, a hard disk drive, or the like and functions as a storage unit. The internal storage 250 stores a program executed by the CPU 248, data referenced by the CPU 248 in execution of the program, or the like.

Further, the internal storage 250 can store the detached-state information such as advertisement information, guidance information, or the like to be displayed on the display 202 when the mobile information device 100 is detached from the support stand 200.

Further, the support stand 200 may have a wireless communication unit in addition to the wired communication unit 238 or instead of the wired communication unit 238. The CPU 108 of the mobile information device 100 can be connected to the network 16 by a wired connection or a wireless connection via the wired communication unit 238 or the wireless communication unit of the support stand 200. For example, in response to detection of being attached on the support stand 200, the CPU 108 of the mobile information device 100 can be connected to the network 16 by a wired connection or a wireless connection via the wired communication unit 238 or the wireless communication unit of the support stand 200. Further, for example, the CPU 108 of the mobile information device 100 in the detached state can be connected to the support stand 200 by a wired connection or a wireless connection and connected to the network 16 by a wired connection or a wireless connection via the wired communication unit 238 or the wireless communication unit of the support stand 200.

The information processing apparatus 10 having the mobile information device 100 and the support stand 200 is configured in such a way.

The information processing apparatus 10 according to the present example embodiment can display and present information to a salesclerk and a customer facing each other by using the mobile information device 100 and the display 202. Accordingly, the salesclerk may smoothly process an interaction with the customer.

Further, the mobile information device 100 can be detached from the support stand 200 and used by a salesclerk if necessary. The mobile information device 100 functions as a part of the POS apparatus in a state of being attached to the support stand 200 and, in addition, can function as an apparatus used for another use than the POS apparatus, such as an inventory management process, in a state of being detached from the support stand 200. Accordingly, the information processing apparatus 10 according to the present example embodiment can perform various processes by using the mobile information device 100.

Furthermore, when the mobile information device 100 is detached from the support stand 200, the information processing apparatus 10 according to the present example embodiment switches information to be displayed on the display 202 of the support stand 200 from the attached-state information such as checkout information to the detached-state information that is different from the attached-state information. The detached-state information is information related to an advertisement, information related to guidance, or the like. Accordingly, since appropriate information can be displayed on the display 202 in accordance with the attached or detached state of the mobile information device 100 with respect to the support stand 200, it is possible to effectively use the display 202 of the support stand 200. In such a way, when the mobile information device 100 is detached from the support stand 200, the support stand 200 including the display 202 can function as a digital signage apparatus that transmits information in an image or a video.

Figure 6:
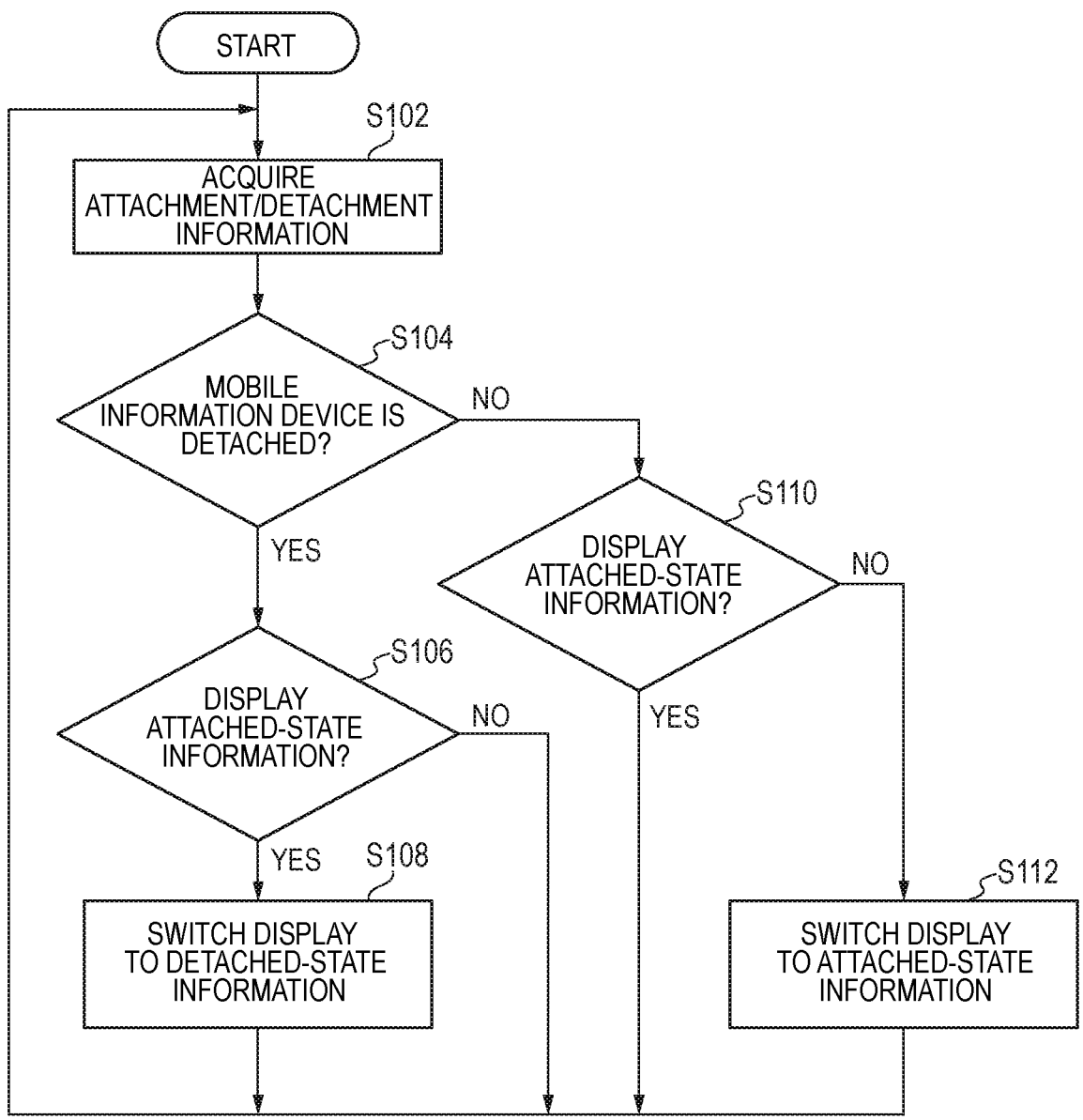
FIG. 6 is a flowchart illustrating an operation of switching display (1) on the information processing apparatus according to the first example embodiment of the present invention.
Figure 8A:
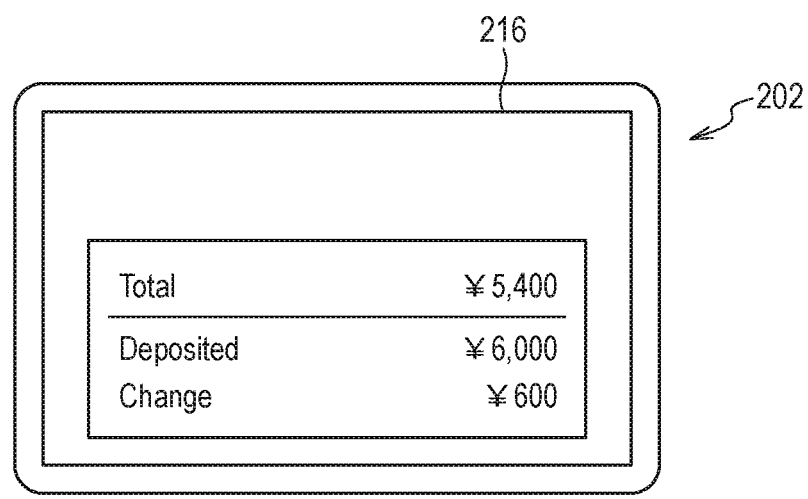
FIG. 8A is a schematic diagram illustrating an example of a display screen in a display unit of a support stand in the information processing apparatus according to the first example embodiment of the present invention.
Figure 8B:
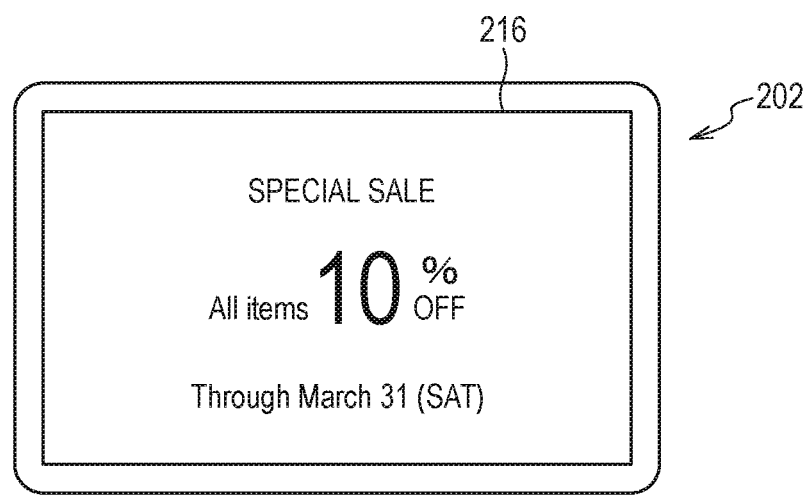
FIG. 8B is a schematic diagram illustrating an example of a display screen in the display unit of the support stand in the information processing apparatus according to the first example embodiment of the present invention.
Figure 8C:
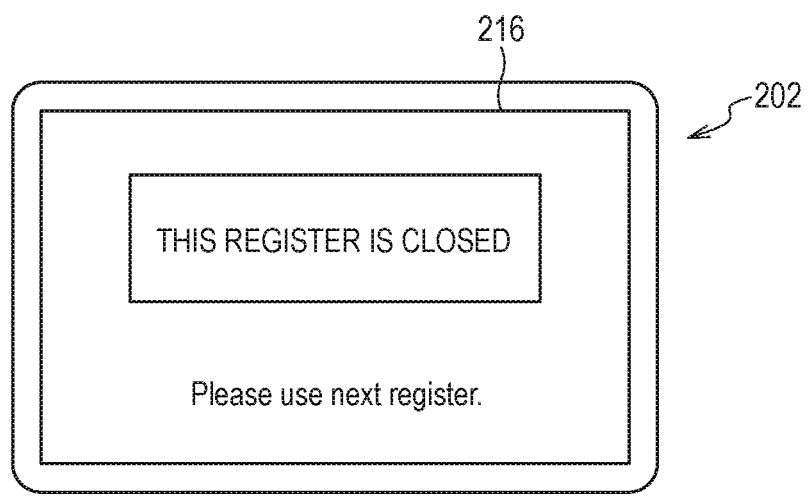
FIG. 8C is a schematic diagram illustrating an example of a display screen in the display unit of the support stand in the information processing apparatus according to the first example embodiment of the present invention.

The operation of switching the display of the display 202 in the information processing apparatus 10 according to the present example embodiment will be further described below with reference to FIG. 6 to FIG. 8C. FIG. 6 and FIG. 7 are flowcharts illustrating the operation of switching the display in the information processing apparatus 10 according to the present example embodiment. FIG. 6 illustrates an operation of switching the display when monitoring the attached or detached state of the mobile information device 100. FIG. 7 illustrates an operation of switching the display when detecting attachment or detachment of the mobile information device 100. FIG. 8A, FIG. 8B, and FIG. 8C are schematic diagrams illustrating an example of a display screen in the display 202 of the support stand 200 in the information processing apparatus 10 according to the present example embodiment. When an operation of switching the display of the information processing apparatus 10 is performed, the information processing method according to the present example embodiment is performed.

First, the operation of switching the display when monitoring the attached or detached state of the mobile information device 100 will be described with reference to FIG. 6.

First, in the support stand 200, the CPU 248 acquires attachment/detachment information that is information indicating whether or not the mobile information device 100 is detached from the support stand 200 (step S102) as illustrated in FIG. 6. The attachment/detachment information is not particularly limited, and it is possible to provide the same attachment/detachment sensor as the attachment/detachment sensor 118 to the support stand 200, detect the attachment or detachment of the mobile information device 100, and acquire the output signal thereof as attachment/detachment information, for example.

Next, based on the acquired attachment/detachment information, the CPU 248 determines whether or not the mobile information device 100 is detached from the support stand 200 (step S104).

Note that the CPU 248 performs step S102 of acquiring attachment/detachment information and subsequent step S104 regularly or irregularly. Thereby, the CPU 248 monitors the attached or detached state of the mobile information device 100.

If the CPU 248 determines that the mobile information device 100 has been detached from the support stand 200 (step S104, YES), the CPU 248 determines whether or not the attached-state information is displayed on the display 202 of the support stand 200 (step S106).

If the CPU 248 determines that the attached-state information is displayed on the display 202 (step S106, YES), the CPU 248 switches the information to be displayed on the display 202 from the attached-state information to the detached-state information (step S108). The CPU 248 displays the detached-state information stored in the internal storage 250.

On the other hand, if the CPU 248 determines that the attached-state information is not displayed on the display 202, that is, the detached-state information is displayed (step S106, NO), the CPU 248 continues to display the detached-state information on the display 202 without change.

Further, if the CPU 248 determines that the mobile information device 100 is still attached to the support stand 200 (step S104, NO), the CPU 248 determines whether or not the attached-state information is displayed on the display 202 of the support stand 200 (step S110).

If the CPU 248 determines that the attached-state information is displayed on the display 202 (step S110, YES), the CPU 248 continues to display the attached-state information on the display 202 without change.

On the other hand, if the CPU 248 determines that the attached-state information is not displayed on the display 202, that is, the detached-state information is displayed (step S110, NO), the CPU 248 switches the information to be displayed on the display 202 to the attached-state information (step S112).

The CPU 248 regularly or irregularly repeats the steps following step S102 described above, thereby monitors the attached or detached state of the mobile information device 100, and displays information in accordance with the attached or detached state on the display 202.

Next, the operation of switching the display when detecting attachment or detachment of the mobile information device 100 will be described with reference to FIG. 7.

First, based on attachment/detachment information, in the support stand 200, the CPU 248 determines whether or not attachment or detachment of the mobile information device 100 from the support stand 200 is detected (step S122) as illustrated in FIG. 7. Note that the attachment/detachment information can be acquired in the same manner as described above.

If the CPU 248 determines that attachment or detachment of the mobile information device 100 is not detected (step S122, NO), the CPU 248 continuously determines whether or not attachment or detachment of the mobile information device 100 is detected (step S122).

On the other hand, if the CPU 248 determines that attachment or detachment of the mobile information device 100 is detected (step S122, YES), the CPU 248 then determines whether or not the mobile information device 100 is attached to the support stand 200 (step S124). That is, the CPU 248 determines whether the attachment or detachment of the mobile information device 100 detected in step S122 is attachment of the mobile information device 100 to the support stand 200 or detachment of the mobile information device 100 from the support stand 200.

If the CPU 248 determines that the mobile information device 100 is attached to the support stand 200 (step S124, YES), the CPU 248 switches the information to be displayed on the display 202 of the support stand 200 from the detached-state information to the attached-state information. Accordingly, the CPU 248 displays the attached-state information on the display 202 (step S126).

On the other hand, if the CPU 248 determines that the mobile information device 100 is not attached to the support stand 200, that is, the mobile information device 100 has been detached from the support stand 200 (step S124, NO), the CPU 248 switches the information to be displayed on the display 202 from the attached-state information to the detached-state information. Accordingly, the CPU 248 displays the detached-state information on the display 202 (step S128).

After step S126 or step S128, the CPU 248 returns to step S122 and continuously determines whether or not attachment or detachment of the mobile information device 100 is detected.

While the information processing apparatus 10 is operated, the operation of switching between the display when monitoring the attached or detached state of the mobile information device 100 and the display when detecting attachment or detachment of the mobile information device 100 is performed as described above. Accordingly, the display on the display 202 of the support stand 200 is switched.

FIG. 8A illustrates an example of the attached-state information displayed on the display 202. In a state where the mobile information device 100 is attached to the support stand 200, the CPU 108 of the mobile information device 100 controls the display on the display 202 to display the attached-state information on the display 202.

The attached-state information may be, for example, checkout information or the like including the amount of price, the amount of deposit, the amount of change, or the like as illustrated in FIG. 8A. Further, the attached-state information may further includes information related to an advertisement or information related to guidance, for example, and a part of information may be duplicated with the detached-state information. The information related to an advertisement or information related to guidance included in the attached-state information may be common to the detached-state information or may be separate from the detached-state information. Further, the attached-state information may be not only the checkout information but also information related to an advertisement or information related to guidance that is different from the detached-state information. The CPU 108 of the mobile information device 100 can display information related to an advertisement or information related to guidance included in the attached-state information on the display 202 when the mobile information device 100 is not operated for a predetermined period, for example.

On the other hand, FIG. 8B and FIG. 8C illustrate an example of the detached-state information displayed on the display 202. In a state where the mobile information device 100 is detached from the support stand 200, the CPU 248 of the support stand 200 controls the display on the display 202 to display the detached-state information on the display 202. The detached-state information may be information different from the attached-state information, or a part thereof may be information duplicated with the attached-state information.

The detached-state information may be, for example, information related to an advertisement as illustrated in FIG. 8B. The information related to an advertisement includes, for example, information to advertise a product, a service, a brand, a company, or the like, information to announce a special sale, a campaign, an event, or the like, or the like.

Further, the detached-state information may be information related to guidance as illustrated in FIG. 8C. The information related to guidance includes, for example, information to guide a customer to a particular place in the shop 1, information to indicate a floor guide of the shop 1, information to announce business hours, a change of business hours, a holiday, or the like of the shop 1, or the like.

Note that the detached-state information can be information having a content in accordance with an installation place where the support stand 200 is installed, for example, information related to an advertisement targeting the clientele of the shop 1 in which the support stand 200 is installed or the like.

As described above, according to the present example embodiment, when the mobile information device 100 is detached from the support stand 200, the information to be displayed on the display 202 of the support stand 200 is switched from the attached-state information to the detached-state information. Accordingly, since appropriate information can be displayed on the display 202 in accordance with the attached or detached state of the mobile information device 100, it is possible to effectively use the display 202 of the support stand 200.

Note that, as the detached-state information, not only the information stored in the internal storage 250 of the support stand 200 but also information stored in the external storage device such as a storage device of a server such as the shop server 12 may be used via the network 16. In such a case, the CPU 248 of the support stand 200 can acquire the detached-state information stored in the external storage device such as a storage device of the shop server 12 via the network 16 to display the acquired detached-state information on the display 202, for example.

Further, as the detached-state information, information streamed by a server such as the shop server 12 may be used. In such a case, the CPU 248 of the support stand 200 can display the detached-state information streamed by the shop server 12 on the display 202 via the network 16, for example.

Second Example Embodiment

An information processing apparatus and an information processing method according to a second example embodiment of the present invention will be described with reference to FIG. 9 and FIG. 10. Note that the same components as those in the information processing apparatus and the information processing method according to the first example embodiment described above are labeled with the same reference, and the description thereof will be omitted or simplified.

Although the case where the CPU 248 of the support stand 200 serves as a subject to switch the display of the display 202 has been described in the above first example embodiment, the example embodiment is not limited thereto. In the following, in the present example embodiment, a case where the CPU 108 of the mobile information device 100 serves as a subject to switch the display of the display 202 will be described. Note that the configuration of the information processing apparatus 10 according to the present example embodiment is the same as the information processing apparatus 10 according to the first example embodiment.

In the present example embodiment, the CPU 108 of the mobile information device 100 functions as a display control unit that switches information to be displayed on the display 202 when the mobile information device 100 is detached from the support stand 200. The CPU 108 controls the display on the display 202 via the wireless display adapter 242 when the mobile information device 100 is detached from the support stand 200.

Further, the internal storage 110 of the mobile information device 100 can store the detached-state information such as advertisement information, guidance information, or the like to be displayed on the display 202 when the mobile information device 100 is detached from the support stand 200.

The operation of switching the display on the display 202 in the information processing apparatus 10 according to the present example embodiment will be described below with reference to FIG. 9 and FIG. 10. FIG. 9 and FIG. 10 are flowcharts illustrating the operation of switching the display in the information processing apparatus 10 according to the present example embodiment. FIG. 9 illustrates an operation of switching the display when monitoring the attached or detached state of the mobile information device 100. FIG. 10 illustrates an operation of switching the display when detecting attachment or detachment of the mobile information device 100. When the operation of switching the display in the information processing apparatus 10 is performed, the information processing method according to the present example embodiment is performed.

First, the operation of switching the display when monitoring the attached or detached state of the mobile information device 100 will be described with reference to FIG. 9.

Figure 9:
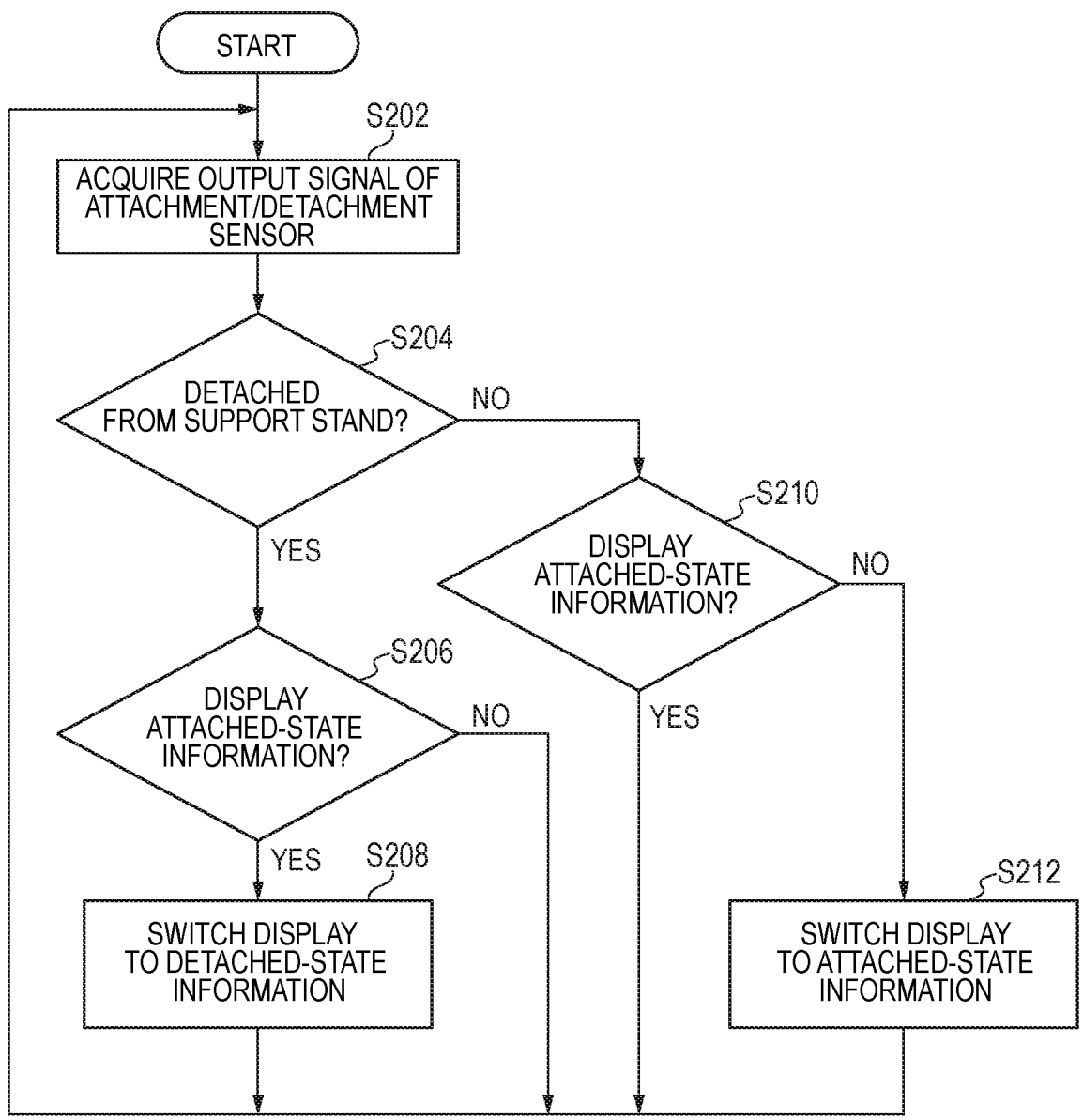
FIG. 9 is a flowchart illustrating an operation of switching display (1) on the information processing apparatus according to a second example embodiment of the present invention.

First, in the mobile information device 100, the CPU 108 acquires an output signal of the attachment/detachment sensor 118 (step S202) as illustrated in FIG. 9. The attachment/detachment sensor 118 detects attachment or detachment of the mobile information device 100 and outputs the output signal in accordance with whether or not the mobile information device 100 is attached to the support stand 200, as described above.

Next, based on the acquired output signal of the attachment/detachment sensor 118, the CPU 108 determines whether or not the mobile information device 100 is detached from the support stand 200 (step S204). Note that the CPU 108 may determine whether or not the mobile information device 100 is detached from the support stand 200 based on information other than the output signal of the attachment/detachment sensor 118, such as information related to whether or not power is supplied from the power supply unit 234 of the support stand 200.

Note that the CPU 108 performs step S202 of acquiring an output signal of the attachment/detachment sensor 118 and subsequent step S204 regularly or irregularly. Thereby, the CPU 108 monitors the attached or detached state of the mobile information device 100.

If the CPU 108 determines that the mobile information device 100 has been detached from the support stand 200 (step S204, YES), the CPU 108 determines whether or not the attached-state information is displayed on the display 202 of the support stand 200 (step S206). Note that the CPU 108 of the mobile information device 100 detached from the support stand 200 can acquire information displayed on the display 202 of the support stand 200 via wireless communication with the wireless display adapter 242, for example. In addition, when the support stand 200 has a wireless communication unit, the CPU 108 can acquire information displayed on the display 202 of the support stand 200 via wireless communication with the support stand 200 by the first wireless communication unit 114 or the second wireless communication unit 116.

If the CPU 108 determines that the attached-state information is displayed on the display 202 (step S206, YES), the CPU 108 switches the information to be displayed on the display 202 from the attached-state information to the detached-state information (step S208). At this time, the CPU 108 wirelessly transmits the detached-state information as display information to the wireless display adapter 242 of the support stand 200 via the first wireless communication unit 114. The CPU 248 transmits the detached-state information stored in the internal storage 110. The wireless display adapter 242 controls the display for the display screen 216 in the display 202 in accordance with the detached-state information wirelessly transmitted from the CPU 108. In such a way, the CPU 108 displays the detached-state information wirelessly on the display 202.

On the other hand, if the CPU 108 determines that the attached-state information on the display 202 is not displayed, that is, the detached-state information is displayed (step S206, NO), the CPU 108 continues to display the detached-state information on the display 202 without change.

Further, if the CPU 108 determines that the mobile information device 100 is still attached to the support stand 200 (step S204, NO), the CPU 108 determines whether or not the attached-state information is displayed on the display 202 of the support stand 200 (step S210).

If the CPU 108 determines that the attached-state information is displayed on the display 202 (step S210, YES), the CPU 108 continues to display the attached-state information on the display 202 without change.

On the other hand, if the CPU 108 determines that the attached-state information is not displayed on the display 202, that is, the detached-state information is displayed (step S210, NO), the CPU 108 switches the information to be displayed on the display 202 to the attached-state information (step S212). At this time, the CPU 108 transmits the attached-state information as display information in a wired manner to the display controller 240 of the support stand 200 connected via the interconnecting connectors 106 and 224 in a wired manner. The display controller 240 controls the display to the display screen 216 of the display 202 in accordance with the attached-state information transmitted in a wired manner from the CPU 108. In such a way, the CPU 108 displays the attached-state information on the display 202 in a wired manner via the support stand 200.

The CPU 108 regularly or irregularly repeats the steps following step S202 described above, thereby monitors the attached or detached state of the mobile information device 100, and displays information in accordance with the attached or detached state on the display 202.

Next, the operation of switching the display when detecting attachment or detachment of the mobile information device 100 will be described with reference to FIG. 10.

Figure 10:
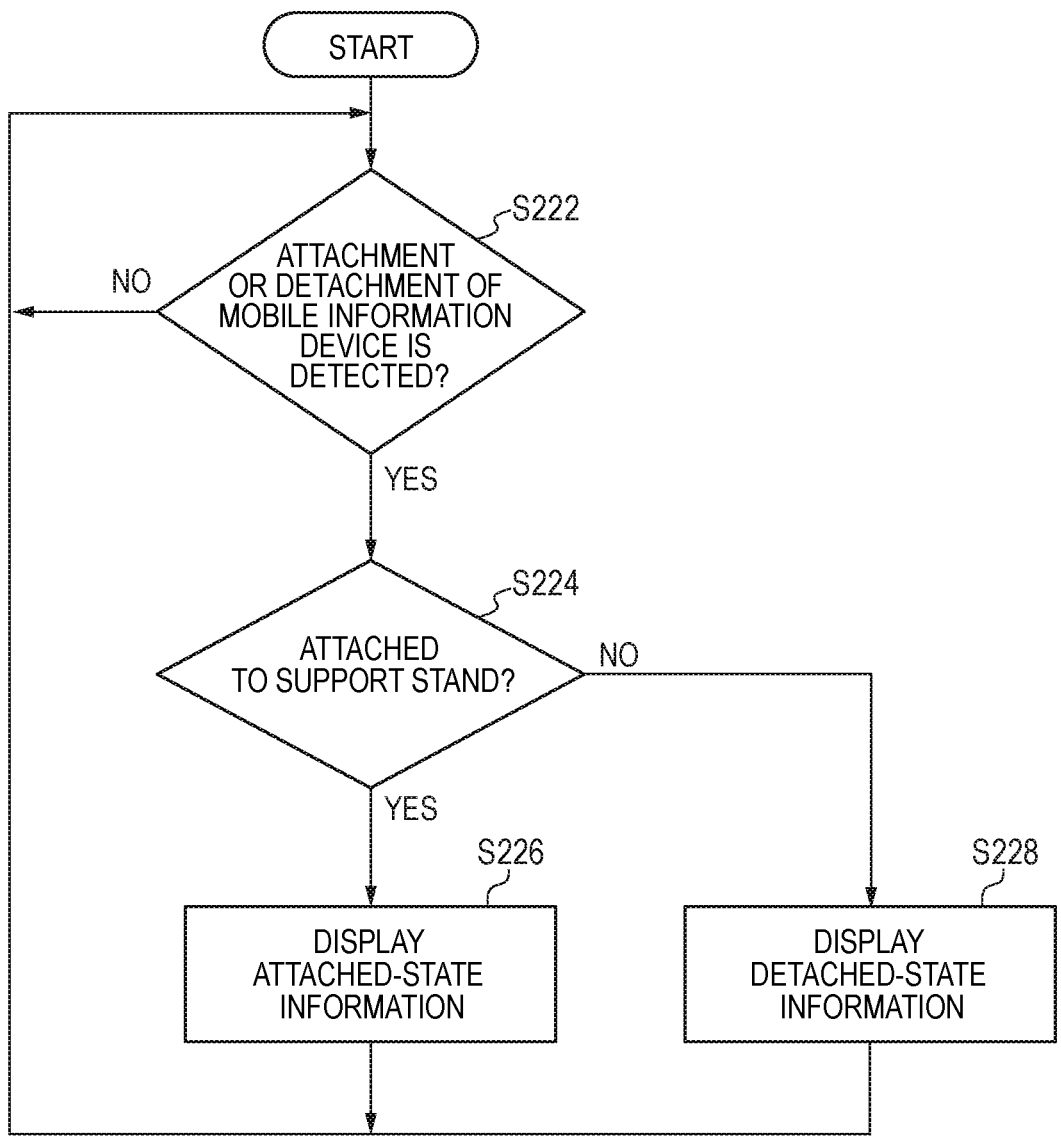
FIG. 10 is a flowchart illustrating an operation of switching display (2) on the information processing apparatus according to the second example embodiment of the present invention.

First, in the mobile information device 100, based on the output signal of the attachment/detachment sensor 118, the CPU 108 determines whether or not attachment or detachment of the mobile information device 100 from the support stand 200 is detected (step S222) as illustrated in FIG. 10.

If the CPU 108 determines that attachment or detachment of the mobile information device 100 is not detected (step S222, NO), the CPU 108 continuously determines whether or not attachment or detachment of the mobile information device 100 is detected (step S222).

On the other hand, if the CPU 108 determines that attachment or detachment of the mobile information device 100 is detected (step S222, YES), the CPU 108 then determines whether or not the mobile information device 100 is attached to the support stand 200 (step S224). That is, the CPU 108 determines whether the attachment or detachment of the mobile information device 100 detected in step S222 is attachment of the mobile information device 100 to the support stand 200 or detachment of the mobile information device 100 from the support stand 200.

If the CPU 108 determines that the mobile information device 100 is attached to the support stand 200 (step S224, YES), the CPU 108 switches the information to be displayed on the display 202 of the support stand 200 from the detached-state information to the attached-state information. Accordingly, the CPU 108 displays the attached-state information on the display 202 (step S226).

On the other hand, if the CPU 108 determines that the mobile information device 100 is not attached to the support stand 200, that is, the mobile information device 100 has been detached from the support stand 200 (step S224, NO), the CPU 108 switches the information to be displayed on the display 202 from the attached-state information to the detached-state information. Accordingly, the CPU 108 displays the detached-state information on the display 202 (step S228).

After step S226 or step S228, the CPU 108 returns to step S222 and continuously determines whether or not attachment or detachment of the mobile information device 100 is detected.

While the information processing apparatus 10 is operated, the operation of switching between the display when monitoring the attached or detached state of the mobile information device 100 and the display when detecting attachment or detachment of the mobile information device 100 is performed as described above. Accordingly, the display on the display 202 of the support stand 200 is switched.

As described above, according to the present example embodiment, when the mobile information device 100 is detached from the support stand 200, the information to be displayed on the display 202 of the support stand 200 is switched from the attached-state information to the detached-state information. Accordingly, since appropriate information can be displayed on the display 202 in accordance with the attached or detached state of the mobile information device 100, it is possible to effectively use the display 202 of the support stand 200.

Note that, also in the present example embodiment, information stored in a server such as the shop server 12 or information streamed by a server such as the shop server 12 may be used as the detached-state information in the same manner as in the first example embodiment.

Another Example Embodiment

Figure 11:
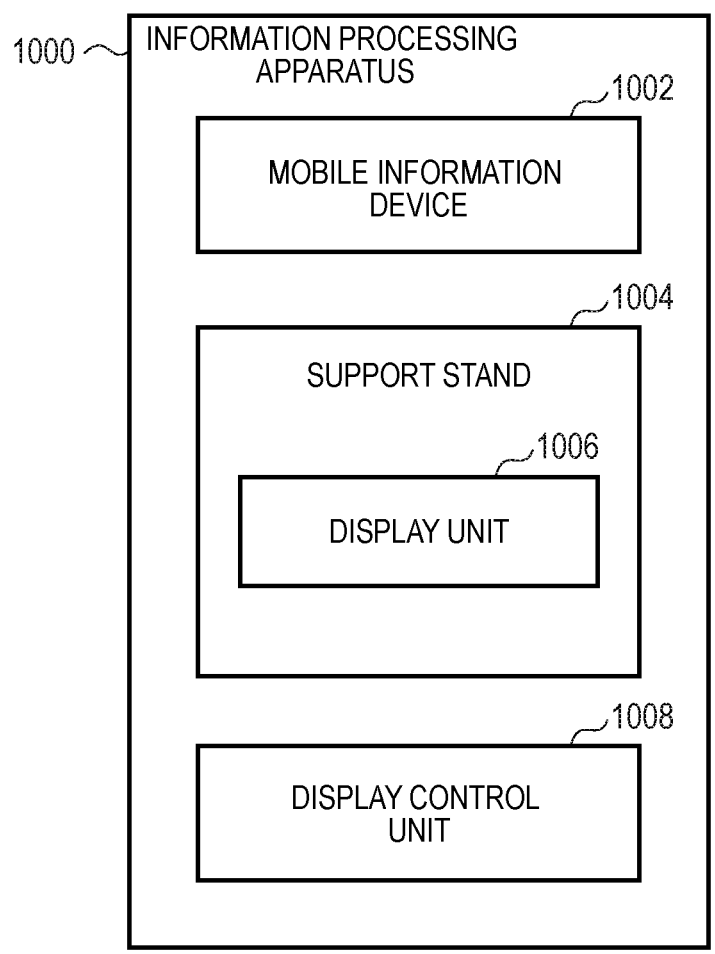
FIG. 11 is a block diagram illustrating a configuration of an information processing apparatus according to another example embodiment of the present invention.

The information processing apparatus described in the above example embodiments may be further configured as illustrated in FIG. 11 according to another example embodiment. FIG. 11 is a block diagram illustrating a configuration of an information processing apparatus according to another example embodiment.

As illustrated in FIG. 11, an information processing apparatus 1000 according to another example embodiment has a mobile information device 1002 and a support stand 1004 that has a display unit 1006 and supports the mobile information device 1002 in a detachable manner. Further, the information processing apparatus 1000 has a display control unit 1008 that switches information to be displayed on the display unit 1006 from first information to second information when the mobile information device 1002 is detached from the support stand 1004.

According to the information processing apparatus 1000 of another example embodiment, since appropriate information can be displayed on the display unit 1006 in accordance with the attached or detached state of the mobile information device 1002, it is possible to effectively use the display unit 1006 of the support stand 1004.

Modified Example Embodiments

The present invention is not limited to the example embodiments described above, and various modification are possible.

For example, although the case where the information processing apparatus 10 is used as a POS apparatus used in a shop where a product is sold has been described as an example in the above example embodiments, the example embodiment is not limited thereto. The information processing apparatus 10 can also be used as a POS apparatus used in a shop where a service is provided.

Further, although the case where the information processing apparatus 10 is used as a POS apparatus has been described as an example in the above example embodiments, the example embodiment is not limited thereto. The information processing apparatus 10 can be used as an apparatus that performs some process in accordance with a content of interaction or the like when an operator interacts with the other party in a face-to-face manner. An application program in accordance with the processing content can be installed in the mobile information device 100 of the information processing apparatus 10. Further, a peripheral device in accordance with the processing content can be connected to the support stand 200.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. The mobile information device 100 and the support stand 200 can function as such a computer. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
a mobile information device;
a support stand that has a display unit and supports the mobile information device in a detachable manner; and
a display control unit that switches information to be displayed on the display unit from first information to second information when the mobile information device is detached from the support stand.

(Supplementary Note 2)

The information processing apparatus according to supplementary note 1,
wherein the support stand has
a first support part that supports the display unit, and
a second support part that supports the mobile information device in a detachable manner on a back side or a side-face side of the display unit.

(Supplementary Note 3)

The information processing apparatus according to supplementary note 1 or 2,
wherein the support stand has a storage unit that stores the second information, and
wherein the display control unit displays the second information stored in the storage unit on the display unit.

(Supplementary Note 4)

The information processing apparatus according to supplementary note 1 or 2, wherein the display control unit acquires the second information stored in an external storage device via a network and displays the acquired second information on the display unit.

(Supplementary Note 5)

The information processing apparatus according to supplementary note 1 or 2, wherein the display control unit displays, on the display unit, the second information that is streamed.

(Supplementary Note 6)

The information processing apparatus according to any one of supplementary notes 1 to 5, wherein the second information is information related to an advertisement or guidance.

(Supplementary Note 7)

The information processing apparatus according to any one of supplementary notes 1 to 6, wherein the second information is information having a content in accordance with an installation place of the support stand.

(Supplementary Note 8)

The information processing apparatus according to any one of supplementary notes 1 to 7,
wherein the support stand
supports the display unit such that the display unit faces a customer side, and
supports the mobile information device such that the mobile information device faces a salesclerk side that is different from the customer side.

(Supplementary Note 9)

An information processing method comprising:
determining whether or not a mobile information device is detached from a support stand that has a display unit and supports the mobile information device in a detachable manner; and
switching information to be displayed on the display unit from first information to second information when the mobile information device is detached from the support stand.

(Supplementary Note 10)

A storage medium storing a program that causes a computer to perform:
determining whether or not a mobile information device is detached from a support stand that has a display unit and supports the mobile information device in a detachable manner; and
switching information to be displayed on the display unit from first information to second information when the mobile information device is detached from the support stand,
wherein the computer is the mobile information device or the support stand.

As described above, while the present invention has been described with reference to the example embodiments, the present invention is not limited to these example embodiments described above. Various modifications that can be understood by those skilled in the art can be made to the configuration and details of the present invention within the scope of the present invention.

This application is based upon and claims the benefit of priority from Japanese Patent Application No. 2018-050947, filed on Mar. 19, 2018, the disclosure of which is incorporated herein in its entirety by reference.

REFERENCE SIGNS LIST 1 shop
2 POS system
10 information processing apparatus
12 shop server
14 access point
16 network
100 mobile information device
200 support stand
202 display
300 peripheral device

What is claimed is:

1. An information processing apparatus comprising:
a support stand;
a mobile information device that is detachably attachable to the support stand and having a salesclerk-facing display that is configured to display salesclerk-related information to a salesclerk; and
a customer-facing display that is fixably attached to the support stand, wherein
the mobile information device comprises at least one processor and at least one memory storing instructions executable by the at least one processor to:
determine that the mobile information device is detachably attached to the support stand;
in response to determining that the mobile information device is detachably attached to the support stand, causing the customer-facing display to display first customer-related information to a customer;
determine that the mobile information device has been detached from the support stand; and
in response to determining that the mobile information device has been detached from the support stand, causing the customer-facing display to switch information displayed to the customer on the customer-facing display from the first customer-related information to second customer-related information,
wherein the second customer-related information is information related to an advertisement advertising a product, a service, a brand, or a company, the advertisement targeting the customer of a store in which the support stand is installed,
and wherein the mobile information device alone, and not in cooperation with any other device, causes the customer-facing display to switch the information displayed to the customer.

2. The information processing apparatus according to claim 1,
wherein the support stand comprises:
a first support part that supports the customer-facing display and to which the customer-facing display is fixably attached, and
a second support part that supports the mobile information device and to which a back or side of the mobile information device is detachably attachable.

3. The information processing apparatus according to claim 1,
wherein the support stand comprises:
a storage device that stores the second customer-related information, and
wherein, in response to the at least one processor of the mobile information device causing the customer-facing display to switch the information displayed on the customer-facing display from the first customer-related information to the second customer-related information, the customer-facing display retrieves the second customer-related information from the storage device and displays the second customer-related information.

4. The information processing apparatus according to claim 1, wherein, in response to the at least one processor of the mobile information device causing the customer-facing display to switch the information displayed on the customer-facing display from the first customer-related information to the second customer-related information, the customer-facing display acquires the second customer-related information from an external storage device storing the second customer-related information via a network and displays the acquired second customer-related information.

5. The information processing apparatus according to claim 1, wherein, in response to the at least one processor of the mobile information device causing the customer-facing display to switch the information displayed on the customer-facing display from the first customer-related information to the second customer-related information, the customer-facing display receives the second customer-related information as is being streamed and displays the second customer-related information.

6. The information processing apparatus according to claim 1, wherein the second customer-related information is information having a content in accordance with an installation place of the support stand.

7. An information processing method performed by a mobile information device and comprising:
- displaying salesclerk-related information to a salesclerk on a salesclerk-facing display of the mobile information device that is detachably attachable to a support stand;
- determining that the mobile information device is detachably attached to the support stand;
- in response to determining that the mobile information device is detachably attached to the support stand, causing a customer-facing display that is fixably attached to the support stand to display first customer-related information to a customer;
- determining that the mobile information device has been detached from the support; and
- in response to determining that the mobile information device has been detached from the support stand, causing the customer-facing display to switch information displayed to the customer on the customer-facing display from the first customer-related information to second customer-related information,
- wherein the second customer-related information is information related to an advertisement advertising a product, a service, a brand, or a company, the advertisement targeting the customer of a store in which the support stand is installed,
- and wherein the mobile information device alone, and not in cooperation with any other device, causes the customer-facing display to switch the information displayed to the customer.

8. A non-transitory storage medium storing a program that causes a processor of a mobile information device to perform:
- displaying salesclerk-related information to a salesclerk on a salesclerk-facing display of the mobile information device that is detachably attachable to a support stand;
- determining that the mobile information device is detachably attached to the support stand;
- in response to determining that the mobile information device is detachably attached to the support stand, causing a customer-facing display that is fixably attached to the support stand to display first customer-related information to a customer;
- determining that the mobile information device has been detached from the support; and
- in response to determining that the mobile information device has been detached from the support stand, causing the customer-facing display to switch information displayed to the customer on the customer-facing display from the first customer-related information to second customer-related information,
- wherein the second customer-related information is information related to an advertisement advertising a product, a service, a brand, or a company, the advertisement targeting the customer of a store in which the support stand is installed,
- and wherein the mobile information device alone, and not in cooperation with any other device, causes the customer-facing display to switch the information displayed to the customer.

* * * * *